D. B. OLIVER.
METALLIC FENCE POST.
No. 10,366. Reissued Aug. 14, 1883.
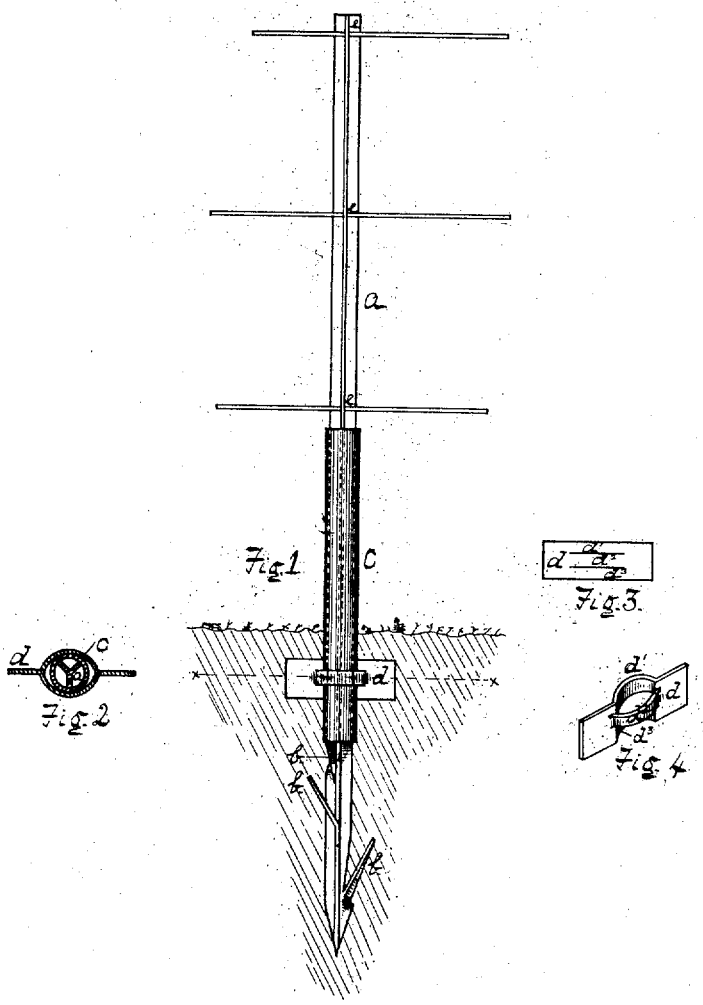
Witnesses
Samuel Forrester
T. B. Arrow
Inventor
David B. Oliver
by his Attys.
Bakewell & Kerr

UNITED STATES PATENT OFFICE.

DAVID B. OLIVER, OF ALLEGHENY, PENNSYLVANIA

METALLIC FENCE-POST.

SPECIFICATION forming part of Reissued Letters Patent No. 10,366, dated August 14, 1883.

Original No. 280,705, dated July 3, 1883. Application for reissue filed July 19, 1883.

*To all whom it may concern:*

Be it known that I, DAVID B. OLIVER, of Allegheny, in the county of Allegheny and State of Pennsylvania, have invented a new and useful Improvement in Metallic Fence-Posts; and I do hereby declare the following to be a full, clear, and exact description thereof.

In the erection of barb-wire fences upon the prairie and other places where there is a scarcity of timber, and where the fences extend a long distance, the expense of wooden fence-posts, owing to scarcity of timber and the increased cost of transportation arising from their bulk and size, has so increased the expense of fencing as to make it extremely desirable to substitute for the wooden posts some other kind of post which will possess the advantages of a wooden post without the bulk and other objectionable features now possessed by it, such as liability to decay, imperfections in the wood, and the impossibility of driving them. Iron posts have been made in various forms to meet this want; but they have been objectionable on account of their inability to resist the lateral surging which is brought upon them by heavy animals running against the wires, and which has a tendency to drag them over diagonally. Moreover, so many of these posts are so expensive in their construction as to be practically excluded from general use, while others are so heavy that the cost of material will accomplish the same result.

It is the object of my invention to substitute for the wooden post an iron post which possesses all the advantages of lightness, strength, and non-liability to displacement which are possessed by the wooden post, and, in addition thereto, smallness of bulk, increased strength and durability, and reduction of cost.

To enable others skilled in the art to make and use my invention, I will now describe it by reference to the accompanying drawings, in which—

Figure 1 is an elevation, partly in section, of my improved fence-post. Fig. 2 is a cross-section on the line *x x* of Fig. 1. Figs. 3 and 4 are views of the stay-plate or anchor.

Like letters of reference indicate like parts in each.

The post *a* is about six feet long, and is composed of angle-iron, preferably of the form shown, with a main web and two flanges projecting at an obtuse angle therefrom. At the lower end it is pointed, and above the point the flanges are slitted diagonally, and the points thus formed are turned out, so as to constitute barbs *b*, the purpose of which is to fix the post more firmly when it is driven into the ground. Encircling the post *a* for a distance of two feet above the barbs *b* is a tube, *c*, which is of any desired size, but corresponds to the size of the post, in the present instance being two inches in diameter. Upon the tube *c* is an anchor or stay-plate, *d*, which is formed from a rectangular piece of iron by slitting it longitudinally twice, as shown in Fig. 3, so as to form three parts, $d'$, $d^2$, and $d^3$, and then pressing the parts $d'$ and $d^3$ laterally in one direction and the part $d^2$ in the other, and then driving the tube *c* down between them while the blank is hot, so that in cooling it shall shrink tightly thereto. The tube *c*, with the stay-plate *d*, is then driven down onto the post, the post being of sufficient size to cause the tube to fit snugly thereon. The post is provided with slots or holes *e* for the attachment of the wires. The purpose of the tube *c* is to stiffen the post at the point of greatest strain, which is at or slightly above the surface of the ground. When the post is driven into the ground, the tube *c* is partly below the surface and partly above, so that the post is strengthened and stiffened by the use of the tube at the point where the greatest strains are put upon it—namely, at and slightly above the surface. The purpose of the stay-plate or anchor *d* is to prevent the post from being sagged laterally by the surging of the wires or by heavy bodies running against them. The plate *d* is made of thin metal, preferably about one-eighth of an inch in thickness, of any suitable length and breadth. Thus constructed, the post is driven into the ground, say, a distance of about two feet, or until the stay-plate *d* is brought below the surface sufficiently to have a broad bearing against the earth.

My improved post is light, cheap in construction, strong, and of small bulk. I can use any form of angle-iron for the post *a*, such as L, T, I, star, or other form. I use the term "angle-iron" to indicate the form of the metallic post, and the word "iron" as a generic term, which includes all varieties of iron and steel, the invention not residing in any particular variety as distinguished from the others.

I am aware that angle-iron has heretofore been employed in constructing fence-posts, and do not broadly claim the same. I am also aware that tubular posts and tubular post-supports have heretofore been devised, and do not herein claim such devices; but I am not aware that an angle-iron post has been pointed and barbed at its lower extremity, as herein specified, or that a tubular sheath has heretofore been combined with such a post; and as I, by so constructing and combining the parts, obtain an exceedingly light and strong post, which, from the character of its anchoring and support, will resist great force or strain, and has peculiar advantages, therefore

What I claim as my invention, and desire to secure by Letters Patent, is—

1. The combination, with the angle-iron post having the laterally-bent barbs below, of the tubular casing inclosing the post, and which extends above and below the ground, the angles and barbs of the post serving to brace the same within the casing against rotation and upward draft, substantially as and for the purposes specified.

2. The angle-iron fence-post having an external tubular casing thereon, so placed as to extend above and below the surface of the ground when the post is set up, substantially as and for the purposes described.

3. A metallic drive-post formed of an angle-iron shaft with a barbed and pointed lower end, a tubular metallic casing placed on the angle-iron shaft, and an anchor or stay-plate rigidly secured to the casing, substantially as and for the purposes described.

In testimony whereof I have hereunto set my hand this 12th day of July, A. D. 1883.

DAVID B. OLIVER.

Witnesses:
W. B. CORWIN,
T. W. BAKEWELL.